No. 791,649. PATENTED JUNE 6, 1905.
F. H. RICHARDS.
APPARATUS FOR MOLDING PLAYING BALLS.
APPLICATION FILED FEB. 10, 1903.

6 SHEETS—SHEET 4.

Witnesses:
A. E. Trudeau
A. W. Pittman

Inventor:
F. H. Richards.

No. 791,649. PATENTED JUNE 6, 1905.
F. H. RICHARDS.
APPARATUS FOR MOLDING PLAYING BALLS.
APPLICATION FILED FEB. 10, 1903.
6 SHEETS—SHEET 5.
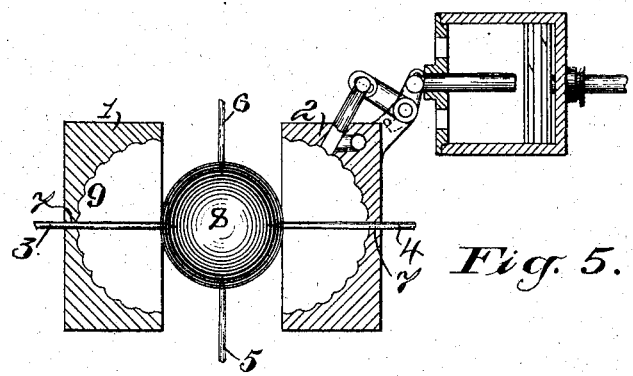
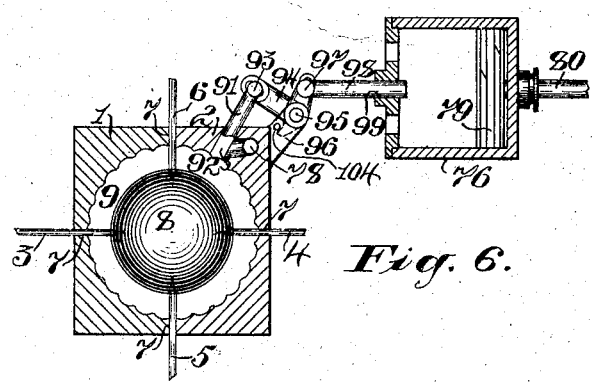
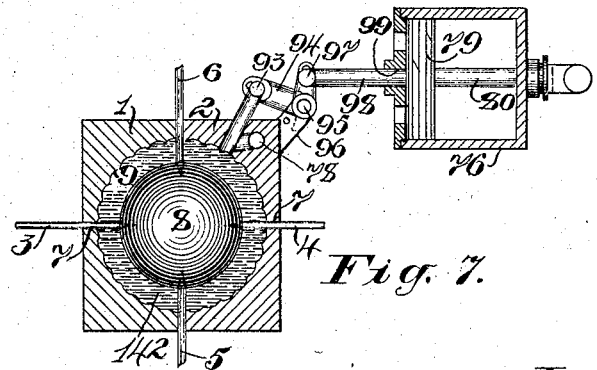

No. 791,649. PATENTED JUNE 6, 1905.
F. H. RICHARDS.
APPARATUS FOR MOLDING PLAYING BALLS.
APPLICATION FILED FEB. 10, 1903.

6 SHEETS—SHEET 6.

Witnesses:
C. A. Jarvis.

Inventor:
F. H. Richards.

No. 791,649.

Patented June 6, 1905.

UNITED STATES PATENT OFFICE.

FRANCIS H. RICHARDS, OF HARTFORD, CONNECTICUT.

APPARATUS FOR MOLDING PLAYING-BALLS.

SPECIFICATION forming part of Letters Patent No. 791,649, dated June 6, 1905.

Application filed February 10, 1903. Serial No. 142,712.

*To all whom it may concern:*

Be it known that I, FRANCIS H. RICHARDS, a citizen of the United States, residing at Hartford, in the county of Hartford and State of Connecticut, have invented certain new and useful Improvements in Apparatus for Molding Playing-Balls, of which the following is a specification.

This invention relates to means for casting shells of gutta-percha or other plastic material upon previously-formed cores of playing-balls; and its object is to improve the mechanism with a view to expediting and cheapening the manufacture of the balls.

Figure 1:
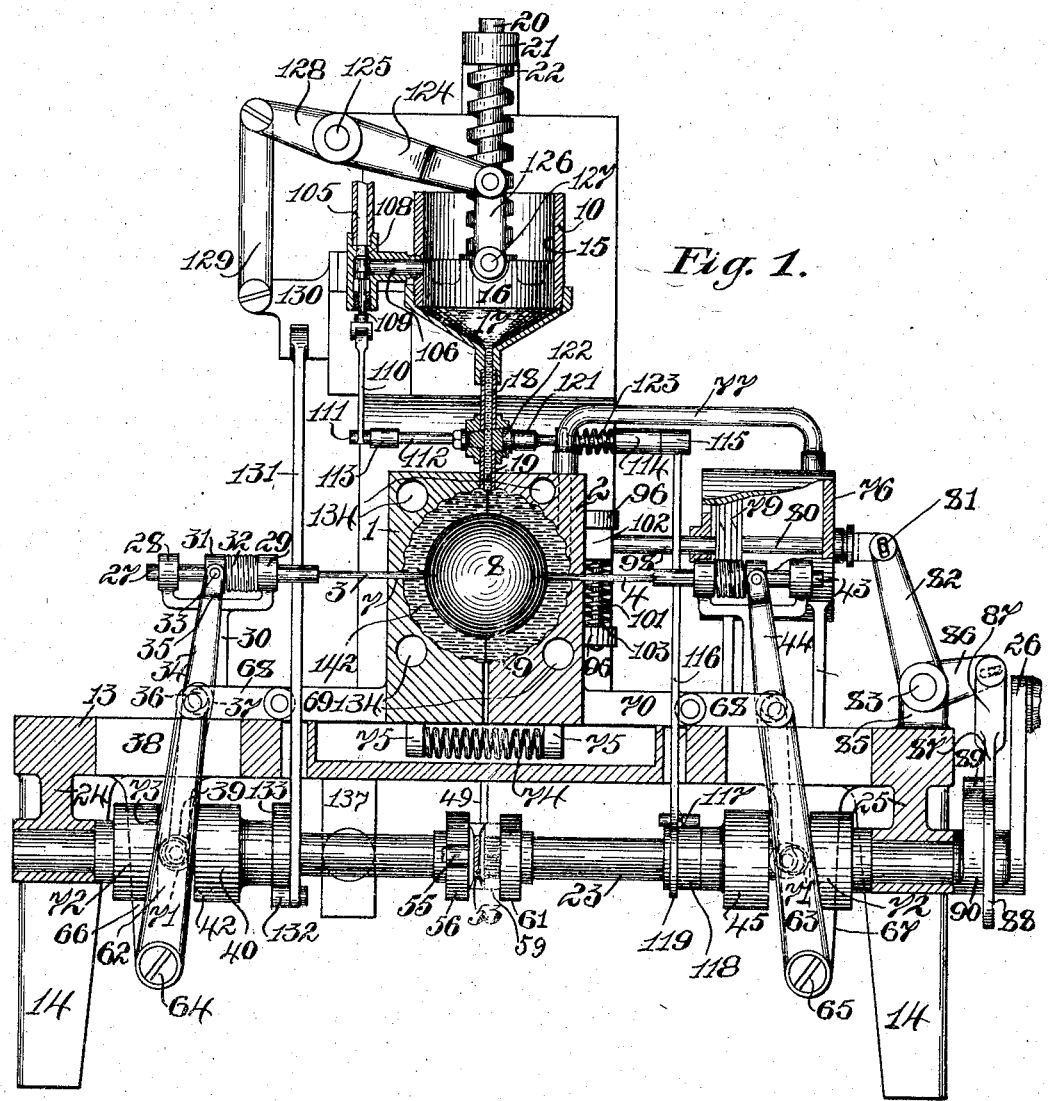
Figure 2:
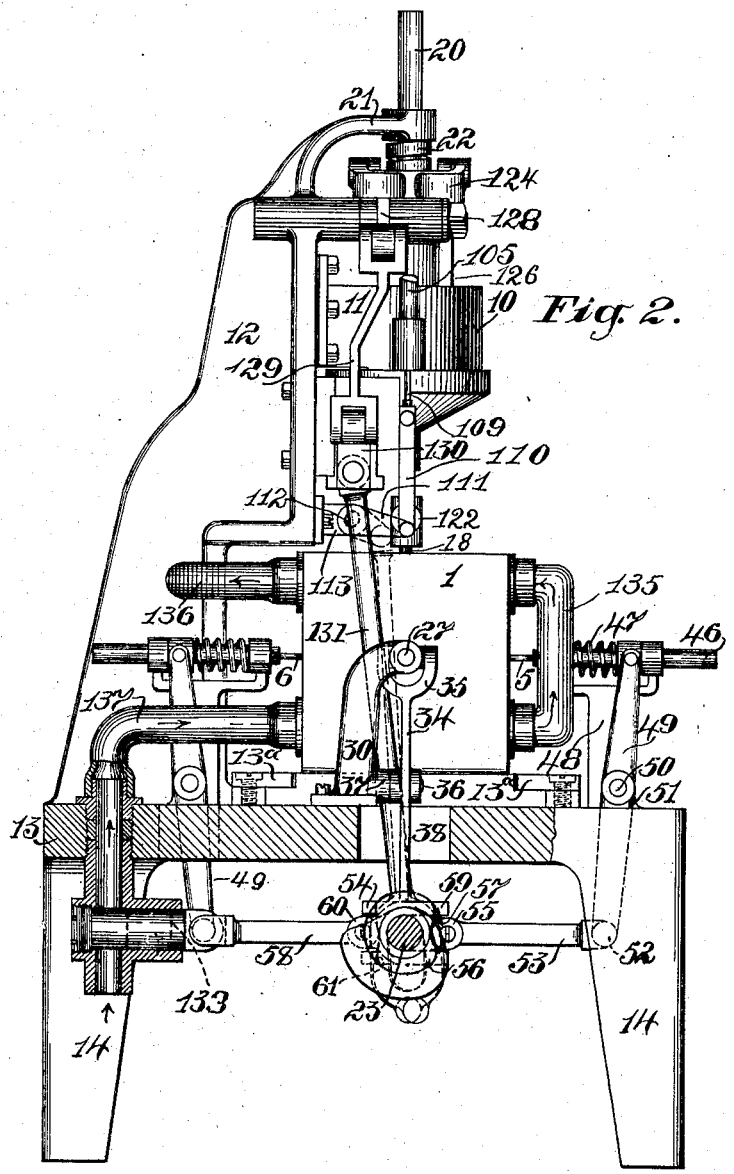
Figure 3:
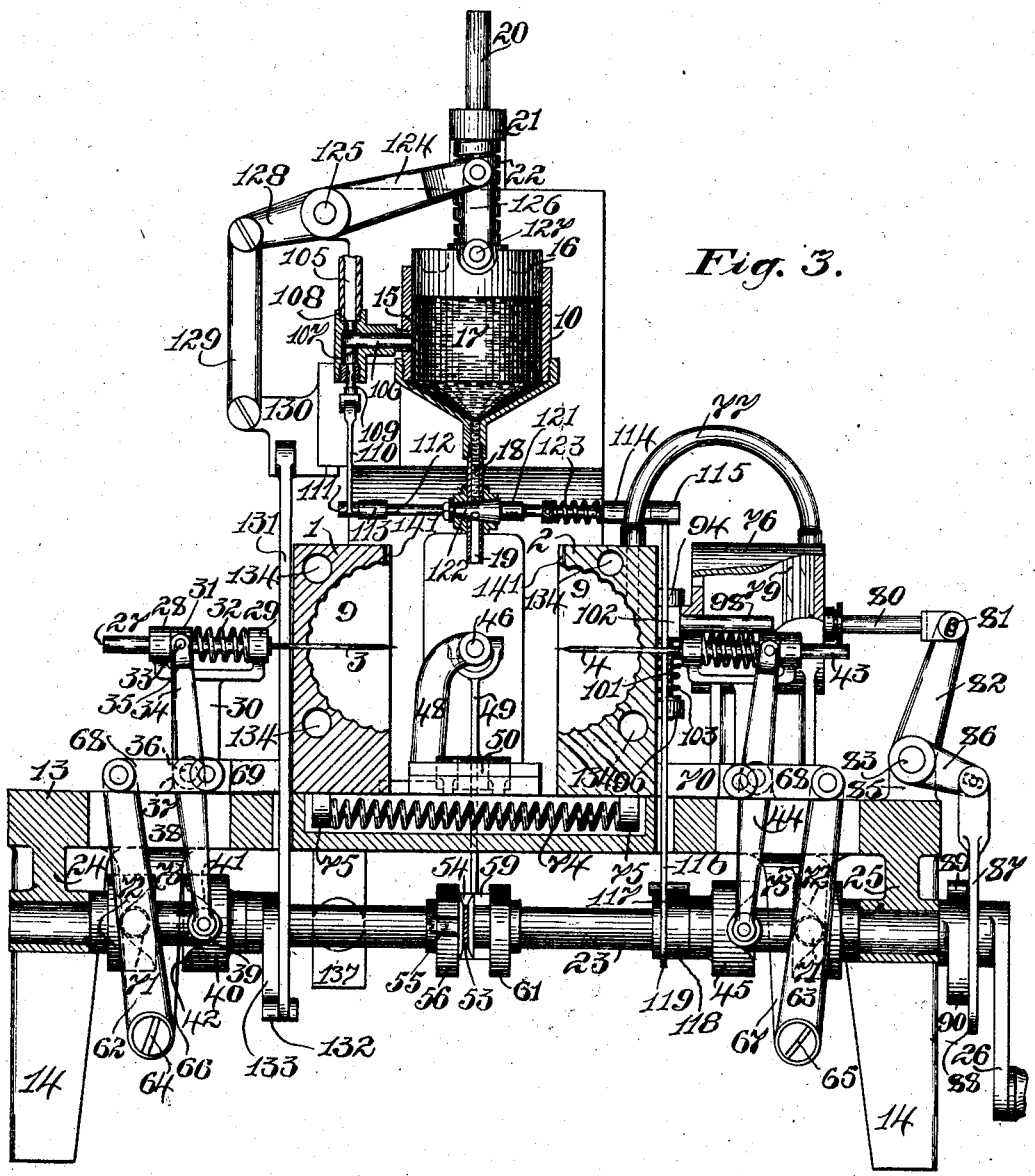
Figure 4:
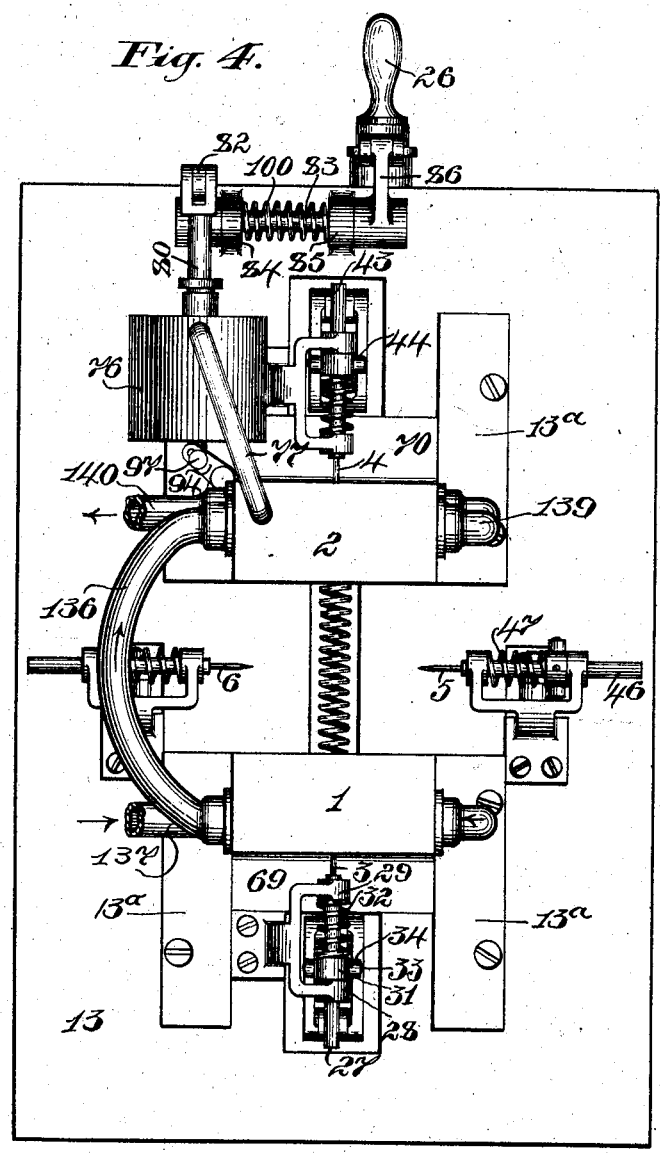
Figure 8:
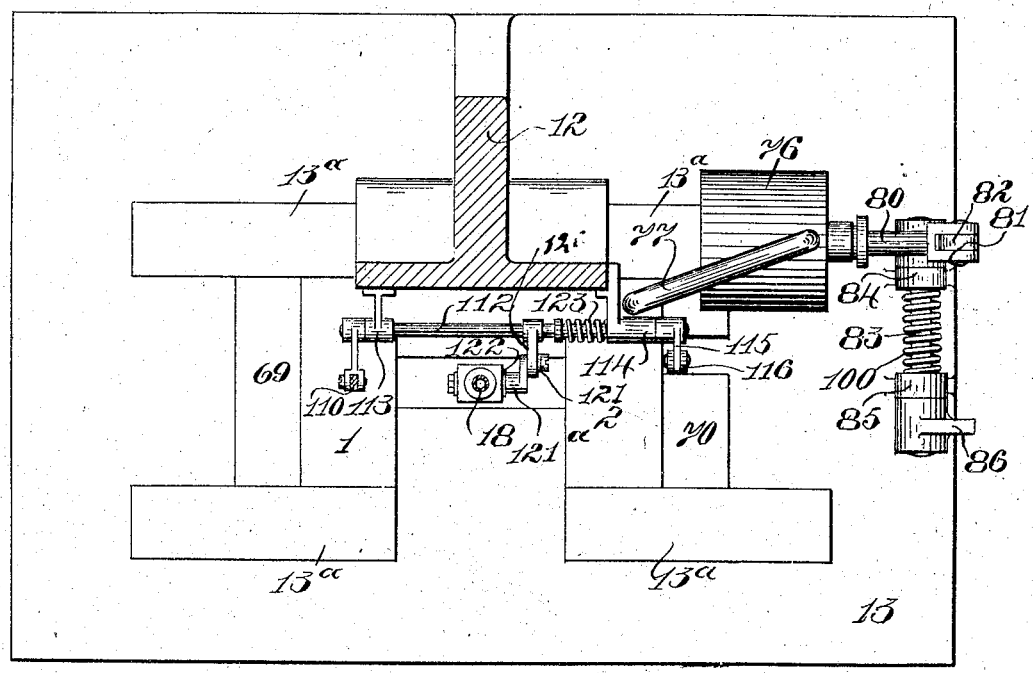
Figure 9:
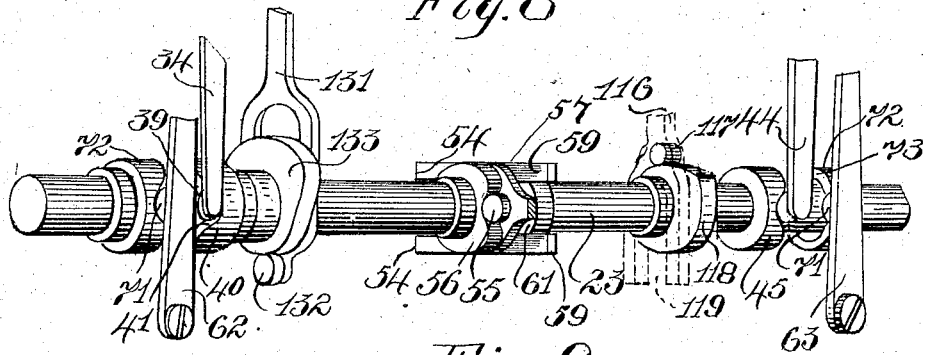

In the drawings forming part of this specification, Figure 1 is a sectional front elevation of the improved apparatus. Fig. 2 is a side elevation, partly in section, taken near the left-hand end of Fig. 1. In Figs. 1 and 2 the parts are shown in operative position. Fig. 3 is a view similar to Fig. 1, but showing the parts in inoperative positions. Fig. 4 is a plan of the lower part of the machine, showing the parts in inoperative position. Figs. 5, 6, and 7 are sectional plan views showing three steps in the operation of forming the shell, Fig. 5 showing the mold as open and the core inserted on the needle-points, Fig. 6 showing the mold closed, and Fig. 7 showing the mold filled with shell material. Fig. 8 is a sectional plan of the upper portion of the apparatus, showing particularly the air-exhausting devices. Fig. 9 is a perspective of the power-shaft and associated devices.

In the several views similar parts are designated by similar signs.

The ball-mold comprises two sections 1 and 2, which are respectively right and left and by horizontal movements are separable laterally one from the other to permit the insertion of the core and the removal of the finished ball. Needle-points 3, 4, 5, and 6, Figs. 1 and 6, are mounted to slide horizontally in and out in suitable apertures 7 in the mold-sections for the purpose of supporting an elastic or other core 8 centrally of the casting-chamber 9, the points 3 and 4 being movable in the same direction as the mold-sections. In the mold said needles support the core against motion in any direction, so as to insure the accurate centering of the core in the finished ball. The number of needles, however, may be greater or less than four. The plane in which the needles move is preferably parallel to the direction of movement of the mold-sections.

A pressure-cylinder 10 for the fluent gutta-percha or other material is supported by a bracket 11, Fig. 2, upon an upright 12, erected upon the bed-plate 13 of the machine, said bed-plate also supporting the mold-sections and being provided with legs 14. This cylinder 10 is provided with a bore 15, in which fits a piston 16, which may be forced down, so as to urge the fluent material 17 down through a vertical duct 18, in communication at its upper end with said cylinder and at its lower end at 19 with the spherical casting-chamber 9 in the closed mold, as at Fig. 1. The piston 16 is carried upon the lower end of a vertical rod 20, guided in an arm 21, formed upon the upper end of the upright 12, a powerful compression-spring 22 being mounted between the piston and the fixed arm and tending to force said piston down.

Means are provided for effecting automatically the inward movements of the needle-points for impaling the core, said means being put into action by means of a horizontal shaft 23, journaled at its ends in hangers 24 and 25 at the sides of the machine and operated by a crank 26 or in any other suitable manner. Said shaft carries a number of cams and other devices, which are mechanically connected to different parts of the apparatus.

Referring particularly to the needle 3, it will be seen that it projects inwardly from a slide 27, mounted in separated bosses 28 and 29, carried upon the upper end of a standard 30, rising from the bed 13. Fixed to said slide between the bosses is a collar 31, and between this collar and the inner boss 29 is mounted a compression-spring 32, which by pressure against the collar tends to keep the needle in its outward or ball-releasing position. To said collar 31 is pivotally connected at 33 the upper end of a lever 34 of the first order, said lever being preferably divided at 35 to fork the collar and being pivoted at 36 to a boss 37, provided at the base of the standard 30.

Said lever extends down through an opening 38 in the bed and at its lower end is provided with a roll 39, which engages a face-cam 40, fixed upon the power-shaft 23. Said cam is provided with a single depression 41, and, as at Fig. 3, the roll 39 is seen at the bottom of said depression, the lever 34, as well as the other parts of the machine, being illustrated in said figure as in normal or inactive position. When the shaft 23 is rotated, said lever is operated by the inclined face of the cam against the action of the spring 32; but during a large part of the revolution of the shaft the roll rides upon a plain or dead edge 42, Fig. 1, of the cam, whereby the needle is maintained in its inward or core-impaling position. The opposite needle 4 is similarly mounted upon the slide 43, which is likewise provided with a spring, as shown, and connected by a lever 44 to a similar cam 45, mounted upon the right-hand portion of the power-shaft 23, whereby the needle 4 is thrust in and retracted simultaneously with the needle 3. The front needle is mounted on a similar slide 46, having a spring 47 and carried by a standard 48 and operated by a lever 49 of the first order, said lever being pivoted at 50, Figs. 2 and 3, to a lug 51, formed upon the bed-plate, and also extending down through the bed and being pivoted at its lower end at 52 to an inwardly-extending horizontal link 53, which at its rear end is provided with a forked portion 54, bestriding the shaft 23, thereby to guide said end of the link. A roll 55 is mounted upon said link and runs in contact with a peripheral cam 56, a depression 57 whereof corresponds in timing and function with the depression 41 in the cam 40, controlling the needle 3, whereby the needle 5 is thrust inwardly or rearwardly and held in its operative position for the same length of time as the needle 3, the roll 55 being held in contact with the cam 56 by means of the spring 47.

The rear needle 6 is provided with a slide, spring, lever, and link similar to those just described, the link being designated as 58 and having its front end divided at 59 to fork the shaft and also having a roll 60 for engaging a cam 61, similar to the cam 56. Thus the four needles move in unison to effective or ineffective positions.

The mold-sections 1 and 2, working in guides 13ª upon the bed, are closed and opened once in each revolution of the main driving-shaft 23, this movement of the mold-sections being effected by means of levers 62 and 63, pivoted at 64 and 65 in the lower ends of hangers 66 and 67 near the ends of the machine-bed, said levers being connected by links 68 to guide extensions 69 and 70, projecting, respectively, from the lower portions of the mold-sections 1 and 2. The levers are provided between their ends with antifriction-rolls 71, which engage face-cams 72 upon the shaft 23 near its ends, said cams having inclined portions such that by a partial revolution of the shaft the levers 62 and 63 are vibrated inwardly or toward each other until the mold-sections are brought together. During the subsequent casting operation the rolls 71 ride upon dead-faces 73 of the cams, thereby holding the mold closed. A compression-spring 74 is extended between lugs 75, depending from the mold-sections, and serves to open the mold when the rolls 71 run down the inclined faces of the cams during the revolution of the shaft. The timing of the mold-driving and needle-driving cams should be so adjusted that the needles reach the ball-transfixing position (shown in Fig. 1) before the mold closes, thereby affording time for the withdrawal of the means whereby the core 8 is inserted.

After the mold is closed and before the injection of the shell material I prefer to exhaust air from the mold, and for this purpose I provide any suitable exhausting apparatus. I illustrate herein diagrammatically a stationary exhaust-cylinder 76, (shown in horizontal section at Figs. 5 to 7,) which is connected by a pipe 77 with an exhaust-port 78 in the mold-section 2. The pipe 77 is made flexible to accommodate the opening and closing movements of the mold-sections. A piston 79 within the cylinder 76 is provided with a rod 80, which is connected by a pin and slot at 81 to the upper end of an arm 82, mounted upon the rear end of a rock-shaft 83, which is journaled in bearings 84 and 85, Figs. 4 and 8, upon the bed 13. Upon its forward end said shaft carries a horizontal arm 86, from which depends a link 87, forked at 88 to bestride the shaft 23 and carrying a roll 89, which rides upon a peripheral cam 90, fixed upon said shaft, whereby the link 87 may be elevated, and the arm 86, shaft 83, and arm 82 may be rocked, thereby forcing the piston 79 the length of the cylinder 76, which operation exhausts air from the spherical chamber 9 of the mold. The cylinder 76 may have any suitable size, so as to secure the desired attenuation of air within the mold, or any other exhausting apparatus may be provided.

For closing the communication between the mold-chamber 9 and the exhauster I provide a plunger-valve 91, working in a cylindrical seat 92, Fig. 6, and adapted to close the port 78. This valve has at its outer end a pin-and-slot connection at 93 with a bell-crank 94, pivoted at 95 upon a bracket 96, fixed upon the mold-section 2, and the bell-crank has a pin-and-slot connection at 97 with an operating-rod 98, which is inserted in a hole 99 at the left-hand end of the exhaust-cylinder 76, said rod 98 being preferably in line with the piston-rod 80. The rod 98 is of sufficient length to accommodate the movements of the mold-section 2, so that when the mold is closed the rod projects slightly within the cylinder 76, as at Fig. 6. When the piston 79 is driven inwardly, it contacts with said rod 98, driving the latter endwise and rocking the bell-crank 94, so as to thrust the valve 91 in and close the exhaust-port 78. Said plunger 91 is preferably formed at its inner end to match the wall of the mold-chamber and when thrust in forms a part of said wall, as seen clearly at Fig. 7, thereby avoiding the formation of a plug of gutta-percha within the end of the port 78 at the casting operation.

A spring 100, Fig. 4, may be coiled around the shaft 83 for forcing the piston and other parts back to normal position during the final portion of the revolution of shaft 23 and cam 90, said cam being formed to permit said return movement at the proper time. The bell-crank 94 includes a shaft 101, mounted in brackets 96 and 102, Figs. 1 and 3, a spring 103 being coiled around said shaft for returning the bell-crank and the valve 91 to normal position. A stop 104, Fig. 6, may be provided for limiting the return movements of the valve and bell-crank.

The heated and fluent gutta-percha 17 is received into the forcing-cylinder 10 through a duct 105, which communicates with a port 106, opening into said cylinder. For closing this communication at the proper time I provide a sliding valve 107, which is shown open at Fig. 3 and closed at Fig. 1 against a valve-seat 108. For closing the valve I connect its stem 109 to a link 110, Figs. 2, 3, and 8, which is pivoted to the forward end of an arm 111, the latter being mounted upon a transverse rock-shaft 112, journaled in rigid brackets 113 and 114. At its opposite end said shaft carries an arm 115, from which depends a link 116, having at its lower end a roll 117, riding upon a cam 118, fixed upon the main actuator-shaft 23, said link being forked at 119 to bestride the shaft, whereby it is guided. By means of said cam the link 116 is thrown up and the rocker-arms 115 and 111 vibrated, thereby thrusting up the link 110 and the valve 107 to close the communication at 106, so that the fluent material when subjected to pressure in the cylinder 10 cannot escape back through the duct 105. Said valve-closing rock-shaft 112 also carries an arm 120, Fig. 8, having a pin-and-slot connection at 121 with an arm 121ª, mounted upon a valve 122, inserted in the pipe 18 between the cylinder 10 and the ball-mold, thereby to open communication between the cylinder and the mold at the time that communication is closed at 106, and vice versa. A spring 123 is coiled around the shaft 112 for returning the parts to normal position during the further revolution of the actuator-shaft 23 and the cam 118.

When 106 is closed and 122 is open, the gutta-percha is forced down into the ball-mold by the piston 16. For this purpose a lever 124 of the first order, pivoted at 125 upon the framework and forking the piston-rod 20, as seen at Fig. 2, is connected at each of its forks by links 126 to the piston at 127. The outer arm 128 of the lever 124 is connected by a link 129 and slide 130 to a link 131, whose lower end carries a roll 132 for engaging a peripheral cam 133 upon the main driving-shaft 23, so that upon the revolution of said shaft the spring 22 is permitted to drive the plunger 16 down, thereby forcing the fluent material to fill the ball-mold, while during the continued revolution of the shaft the cam 133 acts upon the roll 132 and pulls down the link 131, slide 130, and link 129 and elevates the forked arm 124 of the lever, together with the piston, thereby compressing the spring 22 and also drawing more fluent material into the cylinder 10, the valve 107 being then open and 122 closed.

For cooling the mold-sections I provide therein upper and lower watercourses 134, which are connected by vertical ducts 135 at the front of the machine, the upper courses being connected to each other at the back of the machine by a flexible duct 136. To the lower left-hand course may be connected a pipe 137, leading to any suitable source of supply, and, if desired, a valve 138, Fig. 2, may be used for opening and closing the pipe 137 at proper intervals. As indicated by the arrows, the water enters the pipe 137 at its lower end and passes through the lower course 134 in one mold-section, then up through the duct 135, then rearwardly through the upper course 134, then across through the flexible duct 136 back through the upper course in the other mold-section, and down through the other duct 139, Fig. 4, then back through the lower course and out through a pipe 140. This circulating apparatus may be used for hot and cold water in alternation, if desired, or for cold water alone.

When the machine is ready to operate, the parts are in position shown at Fig. 3. By any suitable means a ball-core 8 may be inserted, and then the shaft 23 is rotated by means of a crank 26 thereon or otherwise. By the cams 40, 45, 56, and 61 the needle-operating levers 34, 44, and 49 are operated, thereby thrusting in the needles and impaling the core thereon, as seen at Fig. 5. During or immediately following the needle movement the mold-sections are brought together by means of the cam-operated levers 62 and 63 and are held together during the subsequent shell-casting operation. When the mold is closed, the tip of the injecting-tube 19 fits within a hole formed by recesses 141 in the upper parts of the mold, as indicated at Fig. 3. The shaft 23 continuing in operation, the air-exhausting piston 79 is thrust inwardly by means of a bell-crank 82 86, actuated by link 87 and cam 90, and when the air in the mold is rarefied or at the completion of the stroke of said piston the valve 91 closes the air-exhaust port 78, this closing movement being effected through the described action of the piston 79 upon the rod 98, connected with said valve. At the exhausting operation the communication at 122 between the mold and the pressure-cylinder 10 for the gutta-percha is closed; but as soon as the air-exhaust valve 91 closes said gutta-percha valve 122 opens, while the communication between the cylinder 10 and the source of supply is closed by the valve 107, as seen at Fig. 1. Immediately the piston 16 is thrust down by the action of the spring 22 to force gutta-percha from the cylinder 10 through the pipe 18 into the ball-mold, said spring 22 being of sufficient strength to force the gutta-percha in under high pressure. This pressure is maintained while the shell cools and hardens, so that the core 8 is held under permanent compression by the shell 142 of the ball. The cooling and hardening are facilitated by the circulation of cold water through the mold-chambers 134, as already described. During the remainder of the revolution of the shaft the parts are returned to normal position by the several springs or otherwise, as already described, when the completed ball may be removed from the mold and another core inserted and the operation repeated.

Having thus described my invention, I claim—

1. In a machine of the class described, the combination of a ball-mold made in sections, relatively movable core-supporting needles, means for operating the needles, and means connected to said needle-operating means for opening and closing the mold.

2. In a machine of the class described, the combination of a separable ball-mold, a cylinder for receiving fluent material, communicating means between said cylinder and said mold, a piston within said cylinder, a spring tending to operate said piston to force the fluent material into the mold, relatively movable core-supporting needles, means for operating said needles, and means connected to said needle-operating means for opening and closing the mold.

3. In a machine of the class described, the combination of a ball-mold consisting of sections, a cylinder for receiving fluent material, a piston within the cylinder, communicating means between said cylinder and said mold, a spring tending to operate said piston to force the fluent material into the mold, means for retracting said piston against the opposition of said spring, and means connected to said retracting means for effecting a relative movement of the mold-sections.

4. In a machine of the class described, the combination with a ball-mold of a core-supporting needle, an actuator, a cam upon said shaft, and means for enabling said cam to control the movements of the needle.

5. In a machine of the class described, the combination with a ball-mold of a core-supporting needle, a spring tending to move said needle inwardly, an actuator, and a cam upon said power-shaft for moving said needle outwardly against the opposition of said spring.

6. In a machine of the class described, the combination with a separable ball-mold of a set of core-supporting needles, springs for moving said needles inwardly, and power-driven means for retracting said needles.

7. In a machine of the class described, the combination with a ball-mold of a core-supporting needle, a spring for moving said needle, a lever connected to said needle, and a power-driven cam for operating said lever.

8. In a machine of the class described, the combination of a mold, a set of core-supporting needles, a power-driven actuator, and means controlled by said actuator for causing the needles to move inwardly and outwardly in unison.

9. In a machine of the class described, the combination with a separable ball-mold of two pairs of core-supporting needles, the needles in one pair being substantially at right angles to the needles in the other pair, and a single power-driven actuator connected to means for operating said needles simultaneously.

10. In a machine of the class described, the combination with a separable ball-mold of two pairs of core-supporting needles, the needles of one pair being substantially at right angles to the needles in the other pair, a power-driven actuator, four cams upon said actuator, and means for enabling said cams to operate said needles.

11. In a machine of the class described, the combination with a separable ball-mold of two pairs of core-supporting needles, the needles of one pair being substantially at right angles to the needles in the other pair, a power-driven actuator, four cams upon said actuator, means for enabling said cams to operate said needles; said means including levers connected to all of the needles; and links, 53 and 58, connected to two of the levers and divided to fork said shaft and carrying rolls to engage their cams.

12. In a machine of the class described, the combination of a set of core-supporting needles, a set of mold-sections, means for moving the needles in the plane of movement of the mold, and means connected to said needle-operating means for opening and closing said mold.

13. In a machine of the class described, the combination of a set of core-supporting needles, a set of mold-sections, a power-actuator, and means for enabling said actuator to control the movements of the needles and mold-sections.

14. In a machine of the class described, the combination with mold-sections and a driving-actuator of levers connected to said mold-sections, cams upon said actuator for operating said levers, and a spring for effecting one of the opening and closing movements of the mold-sections.

15. In a machine of the class described, the combination with mold-sections and guides therefor of a spring for effecting relative movement of said sections, and power-driven means for effecting reverse movement of the sections.

16. In a machine of the class described, the combination with a set of needles and a set of mold-sections of an actuator, and means for enabling said actuator to cause said needles to move inwardly in the plane of movement of the molds, and subsequently to close said mold-sections.

17. In a machine of the class described, the combination with movable mold-sections, of core-supporting means adapted to be inserted into and withdrawn from said mold, means for operating the core-supporting means, means connected to said operating means for opening and closing the mold, and means for exhausting air from the mold.

18. In a machine of the class described, the combination with a power-driven member of a set of mold-sections, a set of core-supporting needles, an air-exhauster, and means controlled by said power-driven member for closing the mold-sections, moving the needles in the path of movement of the said sections, and operating the exhauster.

19. In a machine of the class described, the combination with a set of mold-sections and means for effecting relative movements thereof, of core-supporting needles adapted to project into and be withdrawn from said mold, mechanism for actuating said needles simultaneously, an air-exhauster, a port in the mold communicating with said exhauster, and means for opening and closing said port.

20. In a machine of the class described, the combination with a set of mold-sections and means for effecting relative movements thereof, of core-supporting needles adapted to project into and be withdrawn from said mold, mechanism for actuating said needles simultaneously, an air-exhauster, a port in the mold communicating with said exhauster, means for opening and closing said port, and a flexible pipe between said port and said exhauster.

21. In a machine of the class described, the combination with relatively movable mold-sections, of a cylinder, a piston therein, means for moving the piston, a port in one of the mold-sections, communicating means between said port and said piston, a valve in said port, and means for enabling said piston to close said valve.

22. In a machine of the class described, the combination with relatively movable mold-sections, of a cylinder, a piston therein, means for moving the piston, a port in one of the mold-sections, flexible communicating means between said port and said piston, a valve in said port, means for enabling said piston to close said valve, said closing means including a rod projecting within the cylinder in the path of the piston, and means for communicating movement from said rod to said valve.

23. In a machine of the class described, the combination with relatively movable mold-sections of an exhauster, a port in one of the mold-sections, a spring-controlled valve for said port, and means for moving the valve in opposition to said spring.

24. In a machine of the class described, the combination of a set of needles, means for operating them, a set of mold-sections, means connected to the needle-operating means for effecting a relative movement between the mold-sections, air-exhausting means, and means for controlling said air-exhausting means.

25. In a machine of the class described, the combination of a set of needles, means for operating them, a set of mold-sections, means connected to the needle-operating means for effecting a relative movement between the mold-sections, air-exhausting means, means for controlling the air-exhausting means, and means for opening and closing communication between the said mold and said exhauster.

26. In a machine of the class described, the combination of a set of movable mold-sections, means for effecting a relative movement of the sections, core-supporting means movable into and out of working position in said mold, means for actuating said needles connected to said section-moving means, and means for forcing fluent material into the mold when closed.

27. In a machine of the class described, the combination of a set of mold-sections, relatively movable core-supporting needles, an actuator, means operable by said actuator for effecting a relative movement of said sections and of said needles, and means also controlled by said actuator for injecting fluent material into the mold.

28. In a machine of the class described, the combination of a set of core-supporting needles, a set of mold-sections, a pressure-cylinder, means for effecting a relative movement of said needles and of said mold-sections, means for enabling said pressure-cylinder to communicate with the mold, and means for closing communication between the pressure-cylinder and the mold.

29. In a machine of the class described, the combination of a set of core-supporting needles, a set of mold-sections, means for injecting fluent material into the mold, an actuator, and means for enabling said actuator to control the movement of the needles, mold-sections and injecting means.

30. In a machine of the class described, the combination with a set of mold-sections, of an actuator, means connected to the actuator for effecting relative movements of the sections, and means also controlled by said actuator for injecting fluent material into the mold and maintaining pressure upon the fluent material while it hardens within the mold.

31. In a machine of the class described, the combination with a set of mold-sections, of an actuator controlling the opening and closing movements of the mold-sections, a fluid-cylinder communicating with the mold, a piston in said cylinder, and means for enabling said actuator to control the movements of said piston.

32. In a machine of the class described, the combination with a set of mold-sections, of an actuator controlling the opening and closing movements of the mold-sections, a cylinder communicating with the mold, a piston in said cylinder, means for enabling said actuator to control the movements of said piston, means whereby fluent material may be admitted to said cylinder, and means for enabling said actuator to open and close communication between the cylinder and the source of supply.

33. In a machine of the class described, the combination with a set of mold-sections, of an actuator controlling the opening and closing movements of the mold-sections, a fluid-cylinder communicating with the mold, a piston in said cylinder, means for enabling said actuator to control the movements of said piston, a valve between said cylinder and the mold, and means for enabling said actuator to control said valve.

34. In a machine of the class described, the combination with a set of mold-sections, of an actuator controlling the opening and closing movements of the mold-sections, a cylinder communicating with the mold, a piston in said cylinder, means for enabling said cylinder to control the movements of said piston, a valve between said cylinder and the mold, means for enabling said actuator to control said valve, means whereby fluent material may be admitted to said cylinder, and means for enabling said actuator to open and close communication between the cylinder and the source of supply.

35. In a machine of the class described, the combination of an actuator; a set of core-supporting needles; means controlled by said actuator for effecting relative movements of said needles; a set of mold-sections; means controlled by said actuator for effecting relative movements of said mold-sections; a pressure-cylinder communicating with the mold; a piston in said cylinder; and means controlled by said actuator for controlling the movements of said piston.

36. In a machine of the class described, the combination of an actuator; a set of core-supporting means; means controlled by said actuator for effecting relative movements of said core-supporting means; a set of mold-sections; means controlled by said actuator for effecting relative movements of said supporting means; a set of mold-sections; means controlled by said actuator for effecting relative movements of said mold-sections; a pressure-cylinder communicating with the mold; a valve between said cylinder and said mold; means for enabling said actuator to control the movements of said valve; a piston in said cylinder; and means controlled by said actuator for controlling the movements of said piston.

37. In a machine of the class described, the combination of an actuator; a set of core-supporting means; means controlled by said actuator for effecting relative movements of said core-supporting means; a set of mold-sections; means controlled by said actuator for effecting relative movements of said mold-sections; a pressure-cylinder communicating with the mold; a valve between said cylinder and said mold; means for enabling said actuator to control the movements of said valve; a piston in said cylinder; means for admitting fluent material to said cylinder; a valve for closing and opening said admitting means; means for enabling said actuator to control the movements of the last-mentioned valve; and means controlled by said actuator for controlling the movements of said piston.

38. In a machine of the class described, the combination of a set of mold-sections, means for effecting relative movement of the sections, means for injecting fluent material into the mold, watercourses in the mold-sections, and a flexible connection between the watercourses.

39. In a machine of the class described, the combination of a set of mold-sections, relatively movable core-supporting needles, means for operating said needles, means connected to said needle-operating means for opening and closing the mold, means for injecting fluent material into the mold, a valve between said injecting means and the mold, means for closing the valve, and means for exhausting air from the mold.

40. In a machine of the class described, the combination of a set of mold-sections, means for effecting a relative movement between the sections, relatively movable core-supporting needles, means for operating the needles, means connected to said needle-operating means for opening and closing the mold, means for exhausting air from the mold, and means for forcing fluent material into the mold.

41. In a machine of the class described, the combination of a set of mold-sections, means for exhausting air from the mold, relatively movable core-supporting needles, an actuator, means operable by said actuator for effecting a relative movement of said sections and of said needles, and means also controlled by said actuator for injecting fluent material into the mold.

42. In a machine of the class described, the combination of a set of core-supporting needles, a set of mold-sections, means for exhausting air from the mold, a pressure-cylinder, means for effecting a relative movement of said needles and of said mold-sections, means for enabling said pressure-cylinder to communicate with the mold, and means for closing communication between the pressure-cylinder and the mold.

43. In a machine of the class described, the combination of a set of core-supporting needles, a set of mold-sections, means for exhausting air from the mold, means for injecting fluent material into the mold, an actuator, and means for enabling said actuator to control the movement of the needles, mold-sections, air-exhausting means, and injecting means.

44. In a machine of the class described, the combination with a set of mold-sections of an actuator, means connected to the actuator for effecting relative movements of the sections, means also controlled by said actuator for exhausting air from the mold, and means also controlled by said actuator for injecting fluent material into the mold and maintaining pressure upon the fluent material while it hardens within the mold.

45. In a machine of the class described, the combination with a separable mold, of means for separating said mold, core-supporting means for operating said core-supporting means and connected to said mold-operating means, means for exhausting air from said mold, of a cylinder, a communication between said cylinder and mold, means for admitting fluent material to the cylinder, a piston in the cylinder, and means for moving the piston to force the fluent material into the mold.

46. In a machine of the class described, the combination with a separable mold, of means for operating said separable mold, core-supporting means movable relatively to said mold, means operating said core-supporting means and connected to the mold-operating means, means for exhausting air from said mold, of a cylinder, a communication between the cylinder and the mold, means for admitting fluent material to the cylinder, means for closing communication between the piston and the means of supply and also between the cylinder and the mold, a piston in the cylinder and means for moving the piston to force the fluent material into the mold, and means for closing communication between the mold and the air-exhausting means when communication is open between the mold and said cylinder.

47. In a machine of the class described, the combination with a set of mold-sections of an actuator controlling the opening and closing movements of the mold-sections, a cylinder communicating with the mold, a piston in said cylinder, means for enabling said actuator to control the movements of said piston, and means connected to said actuator for exhausting air from the mold.

48. In a machine of the class described, the combination with a set of mold-sections of an actuator controlling the opening and closing movements of the mold-sections, a cylinder communicating with the mold, a piston in said cylinder, means for enabling said actuator to control the movements of said piston, means whereby fluent material may be admitted to said cylinder, means for enabling said actuator to open and close communication between the cylinder and the source of supply, and air-exhausting means also controlled by said actuator.

49. In a machine of the class described, the combination with a set of mold-sections of an actuator controlling the opening and closing movements of the mold-sections, a cylinder communicating with the mold, a piston in said cylinder, means for enabling said actuator to control the movements of said piston, a valve between said cylinder and the mold, means for enabling said actuator to control said valve, and air-exhausting means also controlled by said actuator.

50. In a machine of the class described, the combination with a set of mold-sections, of supporting-needles disposed therethrough an actuator controlling the opening and closing movements of the mold-sections, a cylinder communicating with the mold, a piston in said cylinder, means for enabling said actuator to control the movements of said piston, a valve between said cylinder and the mold, means for enabling said actuator to control said valve, means whereby fluent material may be admitted to said cylinder, means for enabling said actuator to open and close communication between the cylinder and the source of supply, and air-exhausting means also controlled by said actuator.

51. In a machine of the class described, the combination of supporting-needles disposed therethrough an actuator; means controlled by said actuator for effecting relative movements of said needles; a set of mold-sections; means controlled by said actuator for effecting relative movements of said mold-sections; a pressure-cylinder communicating with the mold; a piston in said cylinder; and means controlled by said actuator for controlling the movements of said piston, and air-exhausting means also controlled by said actuator.

52. In a machine of the class described, the combination of supporting-needles disposed therethrough an actuator; means controlled by said actuator for effecting relative movements of said needles; a set of mold-sections; means controlled by said actuator for effecting relative movements of said mold-sections; a pressure-cylinder communicating with the mold; a valve between said cylinder and said mold; means for enabling said actuator to control the movements of said valve; a piston in said cylinder; and means controlled by said actuator for controlling the movements of said piston, and air-exhausting means also controlled by said actuator.

53. In a machine of the class described, the combination of supporting-needles disposed therethrough an actuator; means controlled by said actuator for effecting relative movements of said needles; a set of mold-sections; means controlled by said actuator for effecting relative movements of said mold-sections; a pressure-cylinder communicating with the mold; a valve between said cylinder and said mold; means for enabling said actuator to control the movements of said valve; a piston in said cylinder; means for admitting fluent material to said cylinder; a valve for closing and opening said admitting means, means for enabling said actuator to control the movements of the last-mentioned valve; means controlled by said actuator for controlling the movements of said piston, and air-exhausting means also controlled by said actuator.

54. In a ball-casting machine, the combination with a spherical mold composed of sections of at least three needle-slides whose points project into the mold from different sides, and a common actuator for said needle-slides and mold-sections.

55. In a ball-casting machine, the combination with a frame or support, of a spherical mold composed of sections, bearings at four sides of said mold, horizontal needle-slides working in said bearings, levers connected to said slides, and a common actuator for said levers and mold-sections.

56. A machine for casting playing-balls, comprising a spherical mold made in sections, means for supplying fluent material, means for exhausting air from said mold, means for cutting off communication between said air-exhausting means and said mold, means movable through the sections for supporting a core within said mold; said supporting means and said mold being relatively movable; and means for opening and closing the mold.

Signed at Nos. 9 to 15 Murray street, New York, N. Y., this 9th day of February, 1903.

FRANCIS H. RICHARDS.

Witnesses:
B. C. STICKNEY,
JOHN O. SEIFERT.